United States Patent Office 3,618,294
Patented Nov. 9, 1971

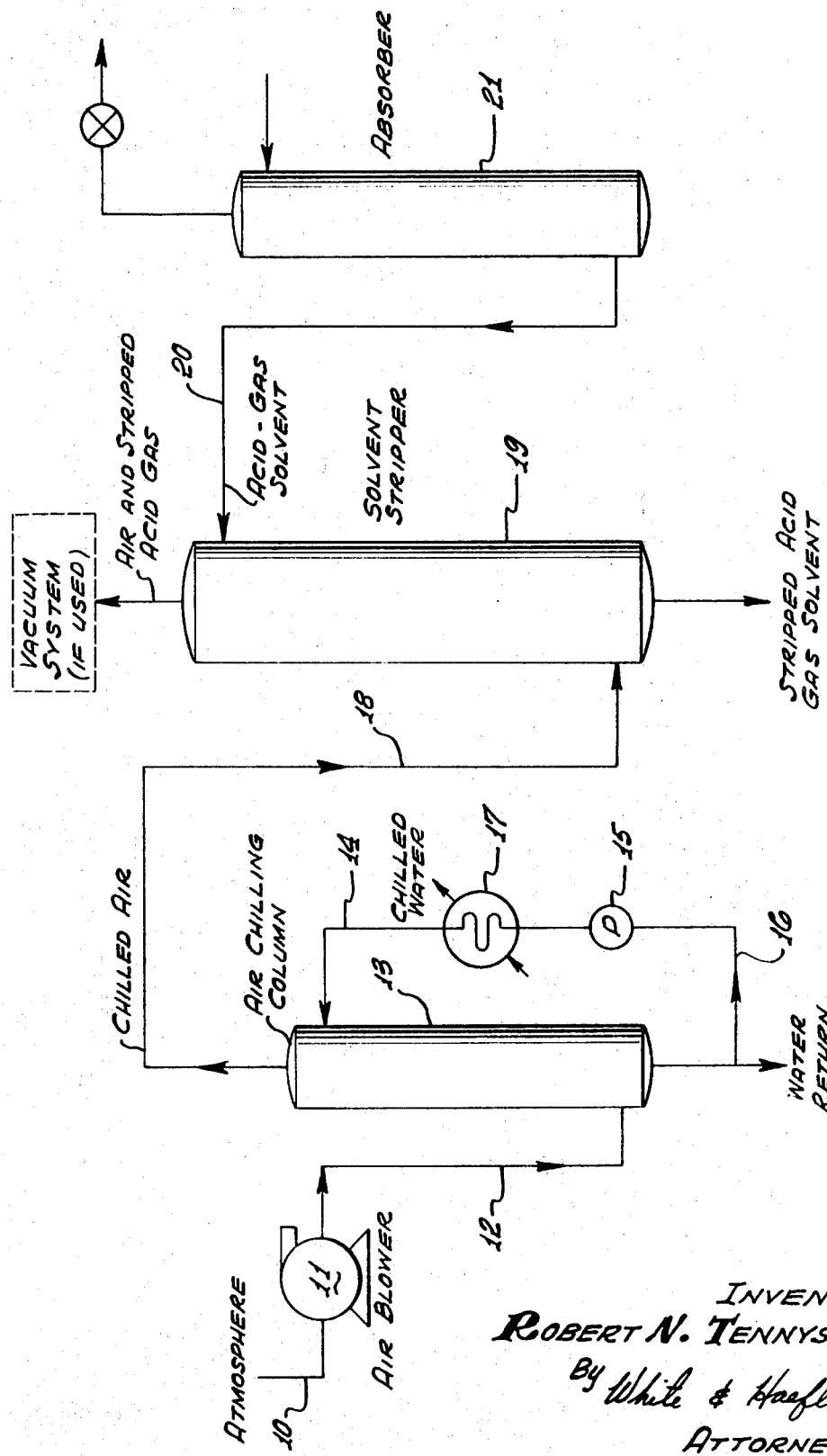

3,618,294
METHOD FOR REDUCING THE WATER CONTENT OF REFINERY COLUMN STRIPPING GASES
Robert N. Tennyson, Anaheim, Calif., assignor to The Fluor Corporation Ltd., Los Angeles, Calif.
Filed Apr. 18, 1969, Ser. No. 817,334
Int. Cl. B01d 53/26
U.S. Cl. 55—29                                10 Claims

ABSTRACT OF THE DISCLOSURE

Moisture absorption in hygroscopic physical solvents for acid gases regenerated by stripping with air or inert gas, is reduced by preliminarily contacting the stripping gas with chilled water to lower significantly the moisture content of the gas and correspondingly the presence of moisture in the solvent undergoing acid gas stripping.

BACKGROUND OF THE INVENTION

Various hydrocarbon gases such as natural gas, synthesis gases and others in the category of refinery gases, customarily are treated for removal of acidic impurities such as carbon dioxide, hydrogen sulfide and sulfur dioxide by contacting the gas with one or the other of two general types of absorbents. One type may be characterized as chemical absorbents, so-called by reason of their chemical reactivity with the acid gas, and the other type is known as physical solvents which are not chemically reactive and effect the separation of acid gases simply by their physical dissolution in the solvent. The present invention is directed to the regeneration of physical solvents by employment of a stripping gas ordinarily passed through a stripping column countercurrently to the solvent.

The usual physical solvents such as propylene carbonate, N-methylpyrrolidone, triacetin and others, are hygroscopic and consequently retain moisture if present in the stripping gas. Such moisture retention tends to lower the efficiency or capacity of the solvent for acid gas extraction. In the past various expedients have been proposed or employed to reduce moisture contamination of the solvent by subjecting the stripping gas preliminarily to dehydration by such conventional methods as refrigeration, absorption in drying solvents or absorption in solid dessicants.

SUMMARY OF THE INVENTION

The present invention provides a simpler and more economical method of preconditioning a stripping gas which contains moisture, by direct contact with chilled water, the temperature of which is below that of the gas so that the effect is to lower the moisture content of the gas in correspondence with the temperature of the chilled water. While applicable to the reduction of moisture in inert stripping gases generally, the invention has particular practical merit and simplicity where atmospheric air is the stripping gas and it is merely necessary to subject air to cooling below normal temperatures by contact with chilled water.

In practical application of the invention the atmospheric air is passed in counterflow contact with chilled water the temperature of which is sufficiently below the air temperature as to result in significant reduction of moisture in the air. The chilled water ordinarily will be maintained in a recirculation cycle through a cooler with withdrawal of accumulated water from the recirculated stream. The stripping gas with its moisture content thus depleted then is used for acid gas stripping of the solvent in any of the conventional manners.

The invention will be more particularly explained by reference to the accompanying flow sheet which is illustrative of a typical embodiment.

DESCRIPTION OF THE PREFERRED EMBODIMENTS

Atmospheric air at a temperature in the range of about 45° F. to 120° F. is delivered at 10 to blower 11 for delivery through line 12 to the chilling column 13 where the system operates at positive pressure, say in the order of 5 p.s.i.g. Where the system operates under vacuum the blower 11 becomes unnecessary.

Within the chilling column 13 the air passes upwardly in direct contact with chilled water introduced through line 14 from which the water may be sprayed in the column or subjected to any of various known expedients for promoting intimacy of the air-water contact. After contact with the air the water may be recirculated by pump 15 through line 16 and a suitable cooler 17, water accumulated by removal from the air being withdrawn from recirculation through line 18.

The chilled air leaving the column at a temperature in the range of about 35 to 65° F. flows through line 18 to stripping column 19 within which the air passes upwardly in direct contact with rich acid gas-containing solvent fed to the column through line 20 from the conventionally illustrated absorber 21. As will be understood from the foregoing, the line 18 stripping gas depletes the stripper solvent, e.g. propylene carbonate, of its acid gas content and the stripping gas by virtue of its lowered moisture content avoids what otherwise, in the absence of the chilled water precooling, would result in contamination of the solvent.

I claim:
1. The method of stripping dissolved acid gas from a hygroscopic liquid solvent in which the acid gas is physically dissolved, that includes directly contacting moisture-containing inert stripping gas in a chilling column with water chilled sufficiently to cool and lower the water content of the gas, removing the cooled inert stripping gas from said chilling column and stripping the acid gas from the solvent by flowing the solvent in direct contact with the cooled gas.

2. The method of claim 1 in which a stream of the gas is cooled by passage countercurrently to a stream of the chilled water.

3. The method of claim 2 in which the source of the stripping gas is atmospheric air at a temperature in the range of about 45° F. to 120° F.

4. The method of claim 3, in which the cooled gas contacted with the solvent is at a temperature in the range of about 35° F. to 65° F.

5. The method of claim 4, in which the water is recirculated to and from a contacting zone through a cooling zone and accumulated water is withdrawn from the recirculated stream.

6. The method of claim 1, in which the solvent is propylene carbonate.

7. The method of stripping dissolved acid gas from a hygroscopic liquid solvent in which the acid gas is physically dissolved, that includes directly contacting moisture containing stripping gas comprising atmospheric air with water chilled sufficiently to cool and lower the water content of the gas, and stripping the acid gas from the solvent by flowing the solvent in direct contact with the cooled gas.

8. The method of claim 7 in which the solvent is propylene carbonate.

9. The method of claim 7 in which a stream of the gas is cooled by passage countercurrently to a stream of the chilled water.

10. The method of claim 7 in which the chilled water temperature is in the range of about 35° F. to 65° F.

References Cited

UNITED STATES PATENTS

| 2,781,862 | 2/1957 | Fussman | 55—68 |
| 3,073,092 | 1/1963 | Ancrum et al. | 55—94 |
| 3,518,812 | 7/1970 | Kolm | 55—94 |

REUBEN FRIEDMAN, Primary Examiner

C. N. HART, Assistant Examiner

U.S. Cl. X.R.

55—53, 68